Oct. 22, 1929.                W. S. PRITCHARD                1,732,417
                                 WINDSHIELD
                            Filed March 23, 1926
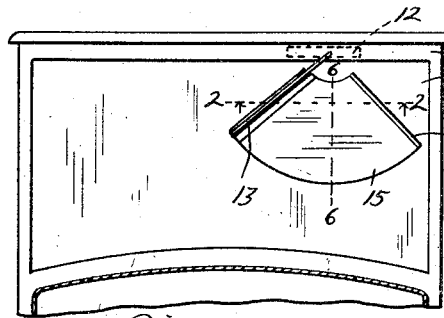
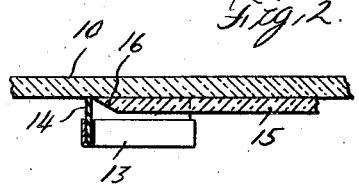
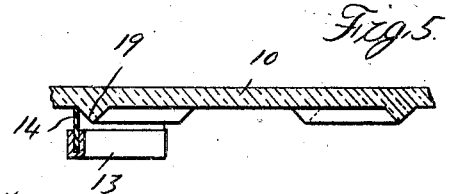
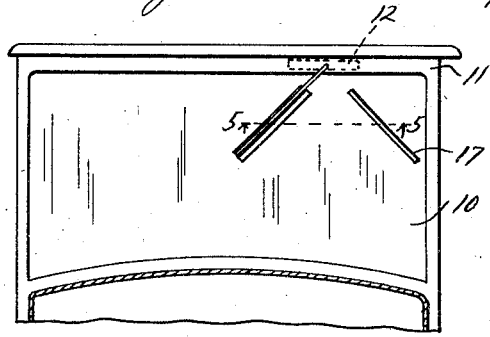
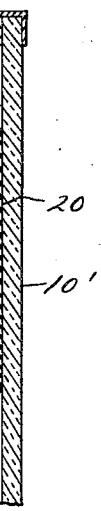
Inventor
William S. Pritchard
Attorneys Patented Oct. 22, 1929

1,732,417

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

WINDSHIELD

Application filed March 23, 1926. Serial No. 96,696.

This invention relates to windshields and more particularly to an improved windshield construction designed to facilitate the employment of a windshield wiper.

The types of windshield wiper at present in practically universal use consist of a wiper arm either automatically or manually oscillated and designed to clean the windshield, or that portion in line with the vision of the operator, by wiping the same with an oscillatory movement. In some windshield wipers of this character the arm carrying the flexible wiper strip is rigidly mounted so that no actual inclination is imparted to the wiper strip but the same is mantained substantially perpendicular to the surface of the windshield glass, the wiper strip being flexed away from the direction of travel during the reverse movement of the wiper arm at each end of its stroke, this flexing resulting from the frictional engagement of the strip with the windshield. In this type of windshield wiper this reverse flexing of the wiper strip is expected to free the strip of the accumulated moisture wiped from the windshield glass during the previous movement of the arm. In many of the more elaborate automatic types of windshield wipers means is provided for positively tilting or inclining the wiper arm with reference to the plane of the windshield glass at the end of each of its strokes while in others the mounting of the arm permits such tilting for the similar purpose of depositing the accumulated moisture and to prevent the arm from carrying or dragging a portion of this moisture back upon the previously cleaned windshield surface during the next stroke. The character of these devices also renders it necessary to reverse the inclination of the wiper arm otherwise it would be impossible or practically so to move the same across the surface of the windshield glass with sufficient frictional engagement to effect the cleaning of the glass surface.

Actual experience has taught that the life of the wiper strips, due to the continual flexing thereof by reason of the reverse movement imparted to the wiper arm at each stroke, is materially shortened and that after a short period of use the wiper strips either become totally unfit for further use or lose such a large amount of their flexibility as to make them practically worthless. Furthermore, it has been found that much of the moisture, dirt and the like carried by the wiper strips is not freed therefrom at the end of each stroke but remains upon the wiper strip and is frequently again distributed over the previously cleaned surface upon the next stroke.

It is therefore an object of this invention to provide means, first for permitting a free reversal of the position or inclination of the wiper strip at each end of its stroke and further to provide means facilitating or assisting in such movement, and second to provide an abutment or shoulder produced by forming the windshield glass at the points adjacent the ends of the wiper arm's strokes in two non-coincident planes whereby the moisture and the like collected by the wiper during its stroke is freed therefrom and conducted away from the path of the wiper arm.

Another feature of the invention is conveniently attained in one of the constructions about to be described by means of which the above objects are made possible and consists in providing an anti-glare shield resulting from the use of celluloid moistened with alcohol to a state of adhesion as a binder between a glass segment and the windshield. It has been found that colorless sheet celluloid moistened to a state of adhesion by means of alcohol and inserted between two sheets of glass, acts as a colorless cement for uniting these sheets of glass and also constitute a medium for diffusing the rays of light from, for instance, the headlights of an approaching automobile.

The above objects and other advantages and novel details of construction of the invention will be made more apparent as this description proceeds, especially when considered in connection with the accompanying drawings wherein Figure 1 is a front elevation of a windshield constructed in accordance with this invention;

Figure 2 is a longitudinal sectional view taken substantially on the plane indicated by line 2—2 in Figure 1;

Figure 3 is a sectional view similar to Figure 2 of a modified form of construction;

Figure 4 is a view similar to Figure 1 of another modified form of the invention;

Figure 5 is a sectional view taken substantially on the plane indicated by line 5—5 in Figure 4 and, Figure 6 is a fragmentary sectional view on line 6—6 of Figure 1 showing in detail another feature of the invention.

Referring now particularly to Figures 1 and 2 of the drawings it will be noted that there is illustrated a windshield 10 to the header 11 of which an automatic windshield wiper 12 of any known or desired construction is attached. This windshield wiper includes an automatically oscillating arm 13 provided with a wiper strip 14 formed usually of rubber or other inherently flexible material. As is customary, the wiper arm 13 with its wiper strip 14 is adapted to be oscillated over the surface of the windshield glass 10 in line with the vision of the operator of the vehicle.

In the form of construction illustrated in Figures 1 and 2 I prefer to provide the windshield glass 10 with a segmental shaped portion or section 15 of glass projecting perpendicularly from the surface of the windshield glass, the substantially vertical edges 16 of which are bevelled. While it may be possible to form the projecting segmental portion 15 integrally with the windshield glass 10 it is considerably more practical and economical to form this section from a separate sheet and to permanently attach the same to the windshield glass as suggested in the drawings, such for instance as by means of a colorless cement.

The segment 15 will be disposed in the line of vision of the operator of the vehicle and will constitute the area cleaned by the windshield wiper or, in other words, the area engaged by the flexible wiper strip 14. Consequently, as the wiper strip 14 approaches the end of its stroke it will move off the edge of the segmental portion 15 and down the inclined edge portion 16 thereof whereupon the moisture and the like in advance of the wiper strip will be moved off the surface of the segment 15 and unto the surface of the main windshield glass 10 and will thereupon flow down the windshield glass along the directing channel formed by the edge of the segment and the windshield glass. Inasmuch as the segment 15 constitutes the vision area of the windshield the flow of the moisture and the like will be controlled by the edge of the segment until the moisture has been directed downwardly past the line of vision of the operator.

Obviously, as the wiper arm moves off the surface of the segment 15 sufficient clearance is provided for the flexible strip 14 to straighten out as suggested in Figure 2 of the drawings and further to freely permit the reverse inclination of this flexible strip upon the beginning of its movement in the other direction across the segment 15. In fact, this reverse inclination of the flexible strip is not only facilitated but assisted because as the wiper arm 13 starts on its return movement the flexible strip 14 will be dragged up the inclined surface 16 thus positively urging the strip 14 to assume the inclined position proper for its return movement across the surface of the segment 15. Furthermore, the wiping edge of the strip 14 is thoroughly cleaned and wiped of any moisture and the like which may have gathered thereon during its previous movement across the windshield surface so that the liability of any such moisture or the like being carried across the previously cleaned surface is eliminated.

In Figure 3 the surface of the windshield glass 10 is formed with a pair of downwardly diverging grooves or recesses 17, the position and inclination of which is coincident or substantially so with the ends of the stroke of the windshield wiper arm. Consequently, as the wiper arm reaches the end of its stroke the flexible strip enters one or the other of the slots 17 which not only act as a guide or gutter for the accumulated moisture for conducting the same downwardly away from the line of vision of the operator but also provide clearance to facilitate the reversing of the inclination of the wiper arm and provide the surfaces 18 which function similarly to the surfaces 16 in the previously described form for wiping any moisture from off the wiper strip and for assisting in reversing the inclination of the flexible strip.

In Figures 4 and 5 the windshield glass 10 is shown as provided with outwardly extending ribs 19, the position and inclination of these ribs being also preferably substantially coincident with the ends of the stroke of the wiper arm. These ribs may be formed integral with the windshield glass or separately and united therewith as for instance by means of a colorless cement. The wiper arm at the ends of its stroke is adapted to pass over these ribs which consequently therefore afford directing means for the accumulated moisture, wipers for the wiping strips and means for facilitating the reversing of the inclination of the wiper strips as before pointed out.

Obviously the invention herein described finds utility in connection with either automatically or manually oscillated or otherwise operable windshield wipers and also is adapted for use in connection with windshield wipers in which the wiping strip is positively inclined with reference to the plane of the glass at the end of each stroke or in which the wiper strip is merely flexed or inclined by reason of its dragging action upon the surface of the glass. In any event, means is provided first, for facilitating the reversal of the wiper strip, second, for directing the accumulated moisture downwardly away from the line of vision of the operator of the vehicle, third, for providing a wiping abutment or shoulder for freeing the wiper strip of accumulated moisture, foreign matter and the like, and lastly, for providing a surface which assists in reversing the position of the wiper strip at the beginning of each stroke.

Referring now particularly to Figure 6 it will be noted that there is shown interposed between the glass segment 15' and the windshield 10' a thin sheet of material which in the present instance consists of colorless sheet celluloid which has been previously moistened with alcohol so as to make the same adhesive. This sheet of celluloid 20 is then placed between the windshield 10' and the glass segment 15' whereupon pressure is applied to hold the glass sheets firmly pressed together until the celluloid 20 has dried and become hardened. This celluloid constitutes a cement or binding agent which is not only colorless so as not to interfere with the vision, but also acts as an anti-glare shield to dissipate the effects of glaring headlights of approaching vehicles and the like.

Several forms of the invention and features have been suggested herein and it will be immediately obvious to those skilled in the art that various other forms may be employed and furthermore, that various changes in the details of construction may be resorted to as are found necessary or expedient according to the character of the windshield wiper or the immediate needs of the installation. Therefore reservation is made to make such changes as may come within the purview of the accompanying claims.

What I claim as my invention is:

1. In combination, a windshield, an oscillatable windshield wiper mounted thereon, downwardly diverging ribs formed on the surface of the windshield adjacent the limits of the wiper stroke and engageable by said wiper, for the purpose described.

2. The combination of a glass, a movable flexible wiper operatively engaged therewith, and means associated with the glass adjacent the limits of the wiper stroke and engageable by said wiper for flexing and reverting the wiper and freeing the same of accumulated moisture.

3. The combination of a glass, a movable flexible wiper operatively engaged therewith, and means associated with the glass adjacent the limits of the wiper stroke over which the wiper is adapted to move for flexing and freeing the wiper of accumulated moisture.

4. The combination with a windshield glass, a movable wiper having a flexible blade operatively associated therewith, and oppositely inclined means on the surface of the windshield glass out of the plane thereof providing abutments over which the flexible blade is adapted to pass adjacent the limits of the wiper stroke whereby at the reversal of the movement of the wiper, the blade is flexed and reversed.

5. The combination of windshield glass, a movable wiper operatively associated therewith, and means on the surface of the windshield glass out of the plane thereof engageable by and over which the wiper is adapted to be moved for freeing the same of accumulated moisture.

6. In combination, a windshield glass, a movable wiper operatively associated therewith, and means on the surface of the windshield glass out of the plane thereof providing abutments adjacent the limits of the wiper stroke engageable by and over which the wiper is adapted to be moved for freeing the same of accumulated moisture.

7. In combination, a windshield glass, a movable wiper operatively associated therewith, and means on the windshield glass out of the plane of the surface thereof engageable by and over which the wiper is adapted to be moved for freeing the same of accumulated moisture and directing it away from the cleaned surface.

8. In combination, a windshield glass, a movable wiper operatively associated therewith, means to reciprocate said wiper and means on the windshield glass out of the plane of the surface thereof providing abutments adjacent the limits of the wiper stroke engageable by and over which the wiper is adapted to be moved for freeing the same of accumulated moisture and directing it away from the cleaned surface.

In testimony whereof I affix my signature.

WILLIAM S. PRITCHARD.